US009515697B2

(12) United States Patent
Raasakka et al.

(10) Patent No.: US 9,515,697 B2
(45) Date of Patent: Dec. 6, 2016

(54) SCANNING CORRELATOR FOR GLOBAL NAVIGATION SATELLITE SYSTEM SIGNAL TRACKING

(71) Applicant: Honeywell International Inc., Morristown, NJ (US)

(72) Inventors: Jussi Raasakka, Brno (CZ); Martin Orejas, Brno (CZ); Ondrej Kutik, Brno (CZ); Jakub Skalicky, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/672,569

(22) Filed: Mar. 30, 2015

(65) Prior Publication Data
US 2016/0294438 A1   Oct. 6, 2016

(51) Int. Cl.
| | |
|---|---|
| H04B 1/00 | (2006.01) |
| H04H 20/74 | (2008.01) |
| H04B 1/709 | (2011.01) |
| G01S 19/26 | (2010.01) |
| G01S 19/36 | (2010.01) |
| G01S 19/30 | (2010.01) |
| G01S 19/29 | (2010.01) |
| G01S 19/22 | (2010.01) |

(52) U.S. Cl.
CPC .............. *H04B 1/709* (2013.01); *G01S 19/22* (2013.01); *G01S 19/26* (2013.01); *G01S 19/29* (2013.01); *G01S 19/30* (2013.01); *G01S 19/36* (2013.01)

(58) Field of Classification Search
USPC ....... 375/130, 140, 146, 142, 147, 148, 149, 375/150, 141, 219, 220, 221, 222, 375/240.26–240.28, 259, 267, 278, 285, 375/284, 295, 302, 307, 306, 304, 309, 375/316, 322, 324, 325, 326, 327, 328, 375/338, 339, 340, 343, 346, 347, 349, 375/354, 359, 360, 362, 364, 365, 371, 375/373, 374, 375, 376; 455/3.02, 3.01, 455/427, 404.2, 440, 441, 456.1, 456.3, 455/456.5, 456.6, 457, 12.1, 91, 98, 95, 455/39, 500
See application file for complete search history.

(56) References Cited

U.S. PATENT DOCUMENTS 5,343,209 A * 8/1994 Sennott .................. G01S 19/42
   342/357.29
5,414,729 A * 5/1995 Fenton .................... G01S 19/22
   342/357.61

(Continued)

OTHER PUBLICATIONS

Burian, "Reduced-Complexity Code Synchronization in Multipath Channels for BOC Modulated CDMA Signals with Applications in Galileo and Modernized GPS Systems", 2009, pp. 1-125, Publisher: Tampere University of Technology.

(Continued)

*Primary Examiner* — Linda Wong
(74) *Attorney, Agent, or Firm* — Fogg & Powers LLC

(57) ABSTRACT

Systems and methods for a scanning correlator for global navigation satellite system signal tracking are provided. In one embodiment, a method for Global Navigation Satellite System (GNSS) receiver tracking comprises: receiving a GNSS navigation signal; generating a local Pseudo Random Noise (PRN) sequence; sampling the GNSS navigation signal over a plurality of integration periods to produce a plurality of scanning values, wherein each scanning value has a respective time offset such that at least one first time offset is not equal to at least one second time offset; estimating at least two points of an autocorrelation function for the GNSS navigation signal based on the plurality of scanning values; and calculating an alignment between the GNSS signal and the local PRN sequence based on the autocorrelation function estimate.

18 Claims, 8 Drawing Sheets

(56) References Cited

U.S. PATENT DOCUMENTS

| | | | |
|---|---|---|---|
| 6,313,789 B1* | 11/2001 | Zhodzishsky | G01S 19/29 342/357.68 |
| 7,688,261 B2* | 3/2010 | DiEsposti | G01S 5/0252 342/357.64 |
| 8,238,489 B2 | 8/2012 | Kim et al. | |
| 8,509,286 B2* | 8/2013 | Hodgart | G01S 19/24 375/147 |
| 8,643,540 B2 | 2/2014 | Pattabiraman et al. | |
| 8,818,435 B2 | 8/2014 | Chopard et al. | |
| 9,037,155 B2* | 5/2015 | Fischer | G01S 5/021 342/385 |
| 2002/0084933 A1* | 7/2002 | Krasner | G01S 5/0027 342/357.63 |
| 2003/0081660 A1 | 5/2003 | King et al. | |
| 2007/0200753 A1* | 8/2007 | Fuchs | G01S 5/0036 342/357.66 |
| 2009/0213912 A1* | 8/2009 | Brenner | G01S 19/22 375/150 |
| 2011/0050496 A1 | 3/2011 | Wu et al. | |
| 2012/0056781 A1* | 3/2012 | Kong | G01S 19/252 342/357.42 |
| 2012/0249367 A1* | 10/2012 | Bryant | G01S 5/10 342/357.25 |
| 2014/0119392 A1* | 5/2014 | Keegan | G01S 19/30 370/542 |
| 2014/0232597 A1* | 8/2014 | Hyun | G01S 19/30 342/357.69 |
| 2015/0200800 A1* | 7/2015 | Yu | G01S 19/24 375/343 |
| 2016/0050034 A1* | 2/2016 | Pearse | G01S 19/03 455/67.14 |

OTHER PUBLICATIONS

Kim et al, "A Novel Multipath Mitigated Side-peak Cancellation Scheme for BOC(kn, n) in GNSS", "ICACT2007", Feb. 12-14, 2007, pp. 1258-1262.

Kim et al, "A New GNSS Synchronization Scheme", "Vehicular Technology Conference, 2009", Apr. 26-29, 2009, pp. 1-5.

Kong, "A Deterministic Compressed GNSS Acquisition Technique", "IEEE Transactions on Vehicular Technology", Feb. 2013, pp. 511-521, vol. 62, No. 2, Publisher: IEEE.

Nunes et al., "Code Tracking Algorithm for GNSS Open-Loop Receivers Using Autocorrelation Interpolation", "Proc ESA Workshop on Satellite Navigation User Equipment Technologies (NAVITEC)", Dec. 2008, pp. 1-8, vol. 1.

Yi et al., "A Method for GPS Multipath Mitigation Based on the Compressed Sampling and the Auto-correlation Function Amplitude Estimation", "Journal of Electronics & Information Technology", Dec. 2013, pp. 2889-2895, vol. 35, No. 12.

European Patent Office, Extended European Search Report from EP Application No. 16162375.6 mailed Sep. 6, 2016, from Foreign Counterpart of U.S. Appl. No. 14/672,569, Sep. 6, 2016, pp. 1-9, Published in: EP.

Fortin et al., "Real-Time Low-Cost Multipath Mitigation Technique Calibrated through Real Data Repeatable Testing", "22nd International Meeting of the Satellite Division of The Institute of Navigation, Sep. 22-25, 2009", , pp. 2316-2328, Published in: Savannah, GA.

* cited by examiner

SCANNING CORRELATOR FOR GLOBAL NAVIGATION SATELLITE SYSTEM SIGNAL TRACKING

BACKGROUND

Signal tracking is one of the most demanding functions performed by a Global Navigation Satellite System (GNSS) receiver. In order to track incoming satellite navigation signals, a conventional receiver includes a plurality of correlators per tracking channel.

One reason a tracking channel may use a plurality of correlators is because GNSS signals are vulnerable to signal deformations, which can result in multi-path error. Some of these effects can be partially mitigated by proper design of the tracking loops, e.g., implementing a narrow correlator to reduce the effect of multipath error. Another reason a receiver may use plurality of correlators is to implement so called Binary Offset Carrier (BOC) modulation schemes. BOC modulated signals will have multiple peaks in their autocorrelation function, which can cause several false lock points for GNSS receiver tracking loops. Conventional implementations add extra correlators to the known false lock point offsets to detect if a false peak is being tracked.

Regardless of the particular reason why a designer chooses to include multiple correlators per tracking channel, the number of correlators used within a receiver has a direct impact on the power consumed by the receiver and the processing resources needed to implement the receiver. For the reasons stated above and for other reasons stated below which will become apparent to those skilled in the art upon reading and understanding the specification, there is a need in the art for systems and methods for a scanning correlator for global navigation satellite system signal tracking.

SUMMARY

The Embodiments of the present disclosure discussed herein provide methods and systems for a scanning correlator for global navigation satellite system signal tracking and will be understood by reading and studying the following specification.

In one embodiment, a method for Global Navigation Satellite System (GNSS) receiver tracking comprises: receiving a GNSS navigation signal; generating a local Pseudo Random Noise (PRN) sequence; sampling the GNSS navigation signal over a plurality of integration periods to produce a plurality of scanning values, wherein each scanning value has a respective time offset such that at least one first time offset is not equal to at least one second time offset; estimating an autocorrelation function for the GNSS navigation signal based on the plurality of scanning values; and calculating an alignment between the GNSS signal and the local PRN sequence based on the autocorrelation function estimate.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
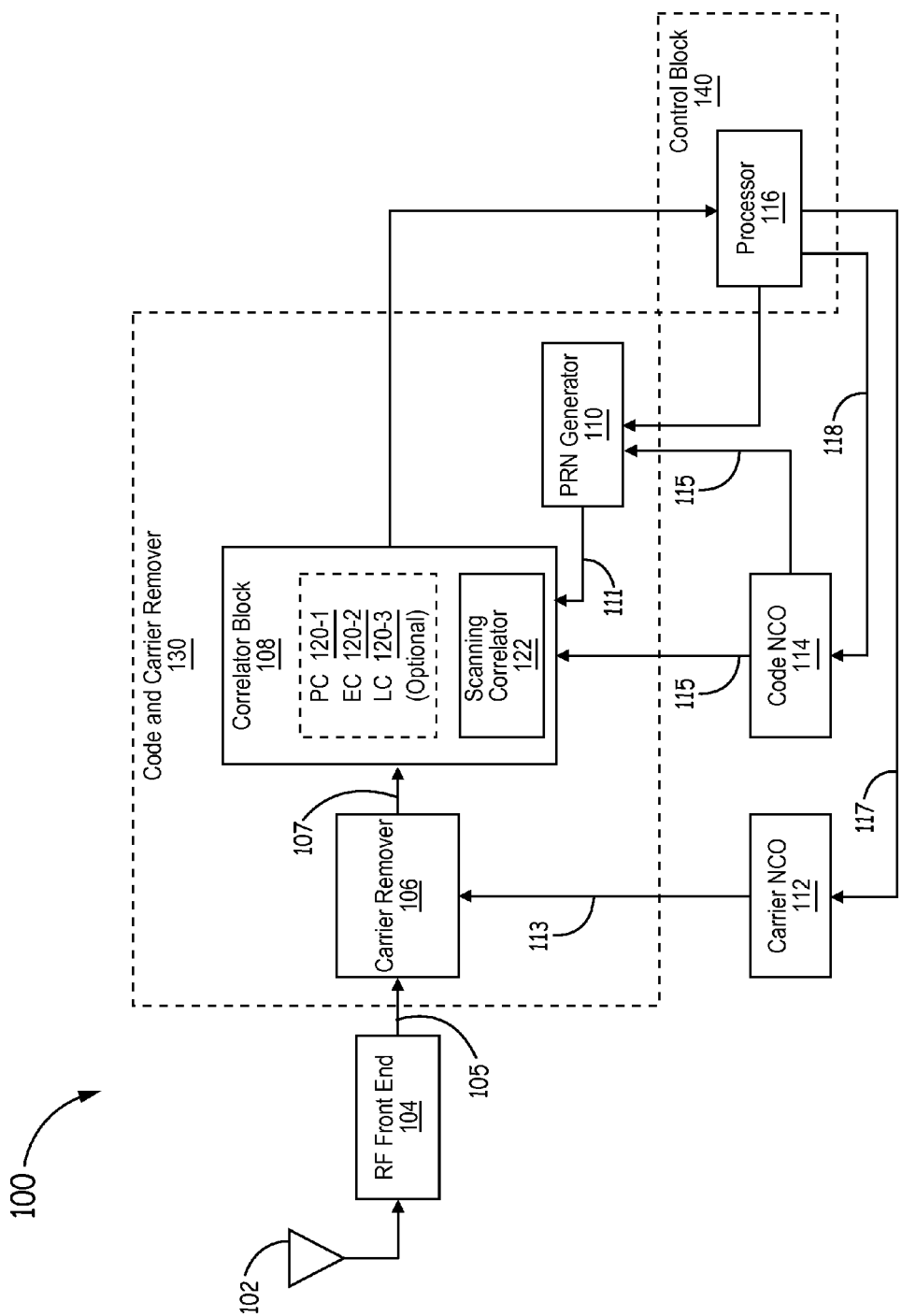
FIG. 1 is a block diagram of one embodiment of an exemplary GNSS receiving system that utilizes a scanning correlator.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments disclosed herein are able to construct the whole autocorrelation function of a GNSS signal without requiring the resources of multiple correlators. The embodiments herein accomplish this by using a scanning correlator that has its code offset varied forward and backward by a fraction of a code chip with respect to a reference point, which in some embodiments is a prompt correlator. As used herein, a "prompt correlator" is a correlator that produces a replica of an incoming signal that is aligned with the incoming signal. After a number of periods with varying code offsets, the autocorrelation function can be constructed. In exemplary embodiments, the scanning correlator can replace other correlators such as prompt correlators, early correlators, and late correlators. In other embodiments, the scanning correlator can be used in conjunction with other correlators.

FIG. 1 is a block diagram of a GNSS receiving system 100 that utilizes one or more scanning correlators 122. GNSS receiving system 100 receives satellite signals from satellites that orbit the earth. For example, the GNSS receiving system 100 receives signals from satellites that are part of the NAVSTAR Global Position System (GPS), GLONASS, GALILEO, or are spoofing signals and signals affected by multipath. However, these are only examples and not meant to be limiting. GNSS receiving system 100 is able to determine its position in relation to the Earth by communicating with the satellites. GNSS satellites each transmit a carrier signal to the GNSS receiving system 100 that has been modulated with Pseudo Random Noise (PRN) and data signals. The data signal includes an accurate time that was provided by at least one atomic clock. The data signal may also describe clock behavior, status messages, and correction data that corrects ionospheric delay, time offsets, and the like. In certain implementations the GNSS receiving system 100 can utilize previously decoded and stored almanac data to speed up the signal acquisition process.

To process the signal from a GNSS satellite, the GNSS receiving system 100 includes an antenna 102 that receives signals transmitted from GNSS satellites. The antenna 102 provides a signal to a Radio Frequency (RF) front end 104. The RF front end 104 may down convert the RF frequency received from antenna 102 for further processing by code and carrier remover 130. For example, in the particular embodiment shown in FIG. 1, the RF front end 104 down converts the RF frequency into an Intermediate Frequency (IF) signal 105. For the embodiment shown in FIG. 1, the RF front end 104 includes amplifiers, mixers, analog to digital converters, and other electronics that may be useful in receiving a signal from a satellite and down converting the signal to an IF. The RF front end 104 passes the IF signal 105 to code and carrier remover 130. However, it should be appreciated that in other embodiments, down converting to an IF signal by RF front end 104 may not be required.

In the embodiment of FIG. 1, code and carrier remover 130 mixes the IF signal 105 to a baseband signal and despreads the incoming signal by removing a code from the incoming signal. As shown in FIG. 1, code and carrier remover 130 comprises a code remover 106 (which may be implemented using an IF Mixer), a correlator block 108 and a PRN Generator 110. To process the IF signal 105, code remover 106 (also referred to herein as IF Mixer 106) mixes the IF signal 105 to form a baseband signal 107. More specifically, the IF signal 105 received at IF mixer 106 is mixed with an oscillating signal 113 produced by a carrier Numerically Controlled Oscillator (NCO) 112. The carrier NCO 112 provides the oscillating signal 113 at a mixing frequency at or near the frequency that is the difference between the IF and the baseband frequency. The baseband signal 107 produced by IF mixer is then passed through a correlator block 108 which removes the PRN code from the incoming signal.

At correlator block 108, baseband signal 107 is correlated with a locally generated PRN sequence 111 generated by the PRN generator 110. The PRN generator 110 is driven by a code NCO 114. More specifically, PRN generator 110 generates PRN sequence 111 at the particular code frequency based on an oscillating signal from code NCO 114. The result of the correlation performed by correlator block 108 is provided to control block 140. Control block 140 includes a processor 116 that processes the correlation results to determine a code and carrier frequency and/or phase offset.

Figure 1A:
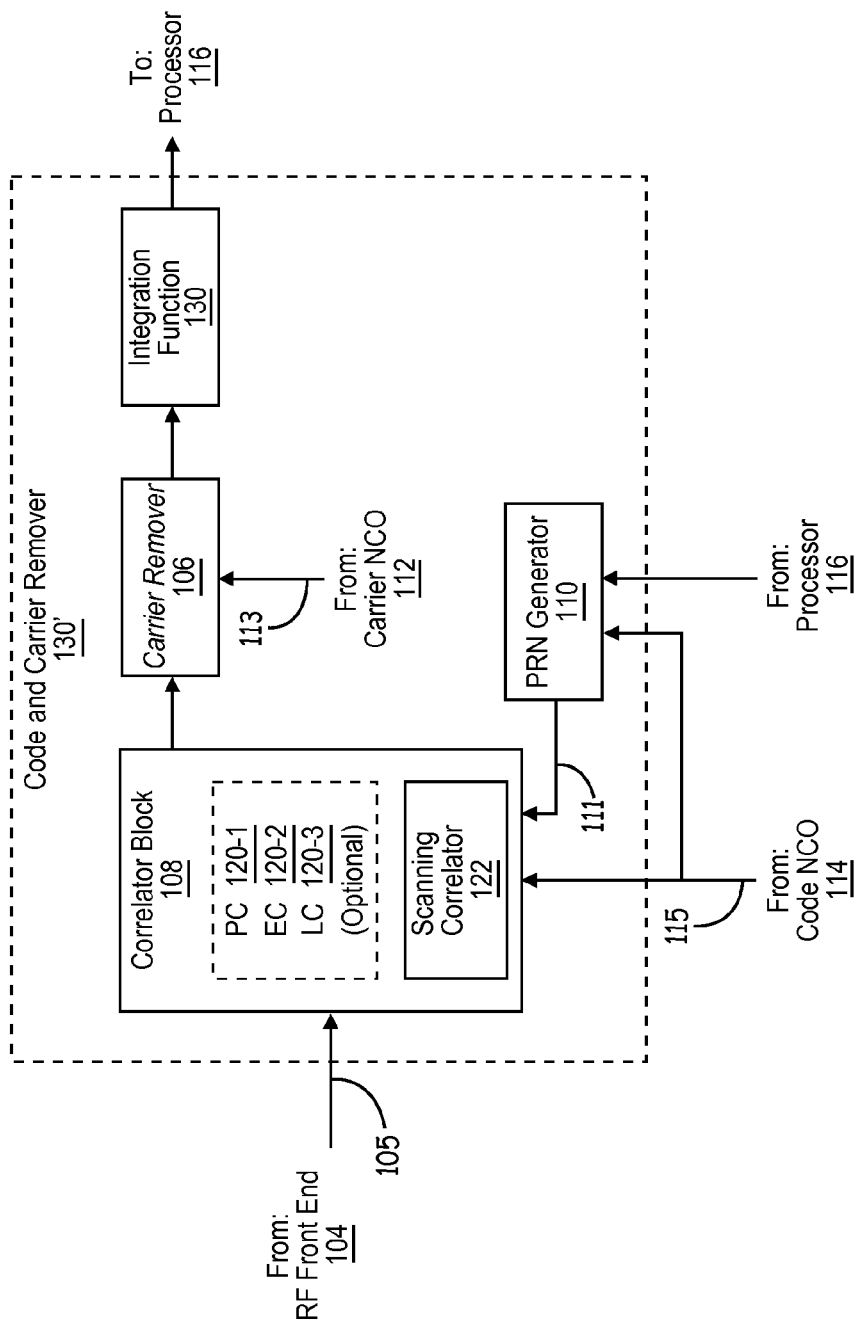
FIG. 1A is a block diagram of an alternate embodiment of code and carrier remover that utilizes a scanning correlator.

As shown in FIG. 1A, in one alternate implementation of system 100, the IF signal 105 may be passed through the correlator block 108 before being mixed down to a baseband frequency. For such embodiments in the integration function of the correlator block 108 is separated from the correlator block 108 (as shown at 130) and performed after IF mixer 106 converts the IF signal to baseband.

The processor 116 sends separate control signals to the code NCO 114 and the carrier NCO 112 based on the output of the correlator block 108. Control signal 117 sets the frequency of the oscillating signal 113 produced by carrier NCO 112. Control signal 118 sets the frequency of the oscillating signal 115 produced by code NCO 114. Control signals 117 and 118 are each adjusted by processor to align the oscillating signals produced by the code NCO 114 and the carrier NCO 112 with the frequencies and/or phases of the signals received from GNSS satellites. With the incoming signal from a GNSS satellite aligned with the PRN code 111 generated locally by the PRN generator 110, and the oscillating signal produced by the carrier NCO 112 aligned with the IF signal 105 received from the RF front end 104, then data can be extracted from the received signal. The data extracted from the received signal can then be used to compute the position of one or more satellites, estimate corrections, and the like. The position and velocity of the GNSS receiving system 100 can be calculated when processing signals from four or more satellites.

The processor 116 can be implemented using software, firmware, hardware, or any appropriate combination thereof, as known to one of skill in the art. These may be supplemented by, or incorporated in, specially-designed Application-Specific Integrated Circuits (ASICs) or Field Programmable Gate Arrays (FPGAs). The processor 116 can also include functions with software programs, firmware, or other computer readable instructions for carrying out various process tasks, calculations, and control functions used in the present embodiments.

As would be understood by one of skill in the art: a prompt correlator is a correlator that produces a replica of the incoming signal that is aligned with the incoming signal; an early correlator is a correlator that produces a replica of the incoming signal that is shifted earlier in time with respect to the prompt replica; and a late correlator is a correlator that produces a replica of the incoming signal that is shifted later in time with respect to the prompt replica.

In the embodiments disclosed herein, as opposed to relying on prompt, early or late correlators, at least one scanning correlator 122 is instead utilized that samples an autocorrelation function of the incoming signal. That is, samples of the incoming signal are taken by scanning correlator 122 over a plurality of integration periods to produce a plurality of scanning values from which an autocorrelation function (or at least two points of the autocorrelation function) can be reconstructed. The scanning values can be used (among other things) to align the local PRN sequence 111 with the IF signal 105 or the baseband signal 107. Each scanning value has a respective time offset such that at least one first time offset of the time offsets is not equal to at least one second time offset of the time offsets. Different possible autocorrelation functions that can be used with the scanning correlator 122 are discussed in relation to FIGS. 2-6 below, as well as how the scanning correlator 122 can be used to mitigate some of the common correlation problems that result from using conventional correlators. It should also be understood that in some implementations of code and carrier remover 130, the correlator block 108 may still include an optional prompt correlator (PC 120-1), an optional early correlator (EC 120-2), or an optional late correlator (LC 120-3), or some combination thereof, which may be used in conjunction with the scanning correlator 122. In some embodiments, the control signals 117 and 118 generated by processor 116 may be calculated based on an output from the scanning correlator 122. In other embodiments, the control signals 117 and 118 generated by processor 116 may instead be calculated based on outputs from early correlator 120-2) and late correlator. It should be understood that in some embodiments, scanning correlator 122 may actually comprise multiple scanning correlators to implement multiple independent signal channels.

FIGS. 2-6 are examples of autocorrelation functions for various incoming GNSS signals that may be sampled by the scanning correlator 122. As stated above, the scanning correlator 122 can reconstruct each autocorrelation function from the scanning values sampled by the scanning correlator 122. The scanning correlator 122 can have configurable integration time. For low levels of carrier-to-noise ratio, a longer integration time can be used to improve the accuracy of the scanning values. Each scanning value sampled by the scanning correlator 122 has a respective time offset. In some exemplary embodiments, the time offset is measured with respect to a prompt value produced by the optional prompt correlator 120-1. For example, if a prompt value is produced by the prompt correlator 120 that is aligned with the chip, then in some embodiments, the other scanning values have time offsets that are in incremented on a predetermined increment with respect to the prompt value. For example, in one implementation the predetermined increment may be +/−0.1*x chips with respect to the prompt value, where x is an integer greater than 1. However, the factor +/−0.1 is only an example and not meant to be limiting. The factor (e.g., +/−0.1) of the time offset will be referred to herein as the "magnitude" of the chip offset. Thus, for example, chip offsets that have a factor of +/−0.1 have a different magnitude than chip offsets that have a factor of +/−0.05.

In other exemplary embodiments, an optional prompt correlator 120-1 is not utilized. In that case, the scanning value can have time offsets measured with respect to the time offset for a first scanning value. For example, instead of the prompt value being aligned with the chip, a first scanning value can be aligned with the chip. In these embodiments, the other scanning values can have time offsets that are in predetermined increments with respect to the first scanning value. For example, in one implementation the predetermined increment may be +/−0.5*x chips, with respect to the first scanning value. Similar to above, the magnitude of +/−0.5 is only an example and not meant to be limiting. In addition, in different embodiments, the magnitude of a time offsets can be one of these exemplary values, +/−0.01 chips, +/−0.05 chips, +/−0.1 chips, +/−0.5 chips etc. and the total time spanned by all the time offsets can be, for example, 1 chip, 2 chips, 3 chips, 4 chips, 5 chips, 6 chips, etc. However, these are only examples and not meant to be limiting. The total time spanned by all the time offsets together will be referred to herein as the "span duration" of the time offsets.

Figure 2:
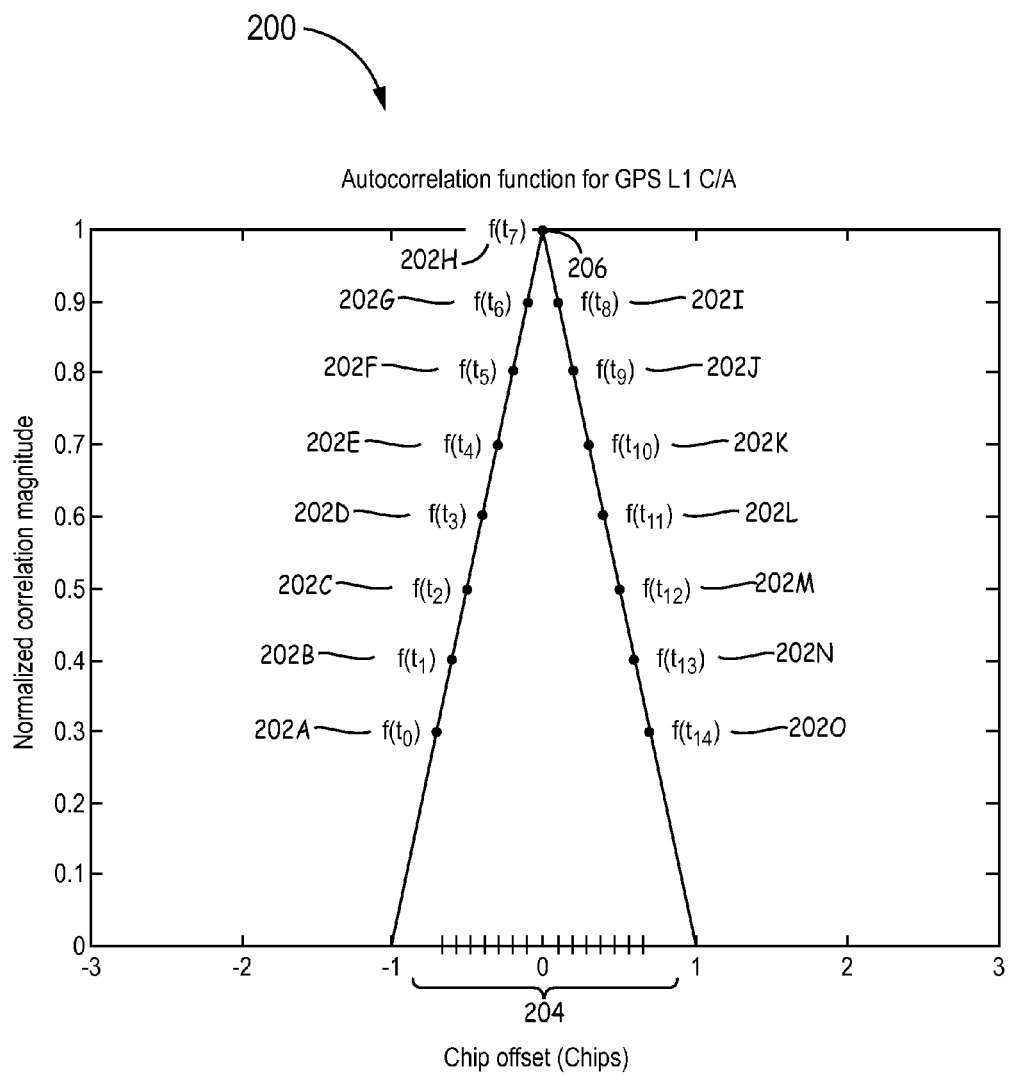
FIGS. 2-6 are examples of autocorrelation functions for various signals that are sampled by the scanning correlator.

FIG. 2 is an example of an autocorrelation function 200 for a Binary Phase Shift Keying (BPSK) modulated signal (e.g. a Global Positioning System L1 frequency Course/Acquisition (GPS L1 C/A) signal in this embodiment) that is sampled by the scanning correlator 122 at respective time offsets 204, (e.g., $t_0$, $t_1$, $t_2$, $t_3$, etc.). The sampling of the autocorrelation function 200 at respective time offsets 204 results in scanning values 202A-202O. In FIG. 2, the respective time offsets 204 are in relation to one another. That is, each respective time offset 204 is with respect to the time offset 204 for scanning value 202A. However, in other exemplary embodiments, each respective time offset 204 can be determined with respect to a prompt value 206 produced by a prompt correlator 120. As stated above, the scanning values 202A-202O can be used to reconstruct the autocorrelation function 200. Furthermore, in this exemplary embodiment, the results from the scanning values 202A-202O are normalized with respect to the prompt value 206 produced by the prompt correlator 120, as shown in FIG. 2. However, in other exemplary embodiments, the scanning values 202A-202O can be normalized with respect to the scanning value that has the greatest magnitude. The term normalizing, as used herein, means to adjust the scale of a value to the scale of the highest magnitude value, such that the value of the highest magnitude value is equal to 1.

In FIG. 2, fourteen different scanning values 202A-202O are produced using fourteen time offsets 204. However, it should be understood that in other exemplary embodiments, either greater or fewer scanning values can be determined by sampling the BPSK modulated signal autocorrelation function 200 at more or less time offsets 204. The number of chosen time offsets 204 can depend on the width of the autocorrelation function 200 and the required resolution. The greater the width of the autocorrelation function 200 and the greater the desired resolution, the more time offsets 204 can be used to produce a greater number of scanning values. For example, in FIG. 2, the magnitude for the time offsets 204 is +/−0.1 chip and the time offsets 204 span a span duration of 1.4 chips (i.e., −0.7 chips and +0.7 chips). However, in other embodiments, the time offsets can span different span durations, e.g., 1 chip, 2 chips, 3 chips, 4 chips, 5 chips, 6 chips, etc. and the time offsets 204 can have a different magnitude, e.g., +/−0.01 chip, +/−0.05 chip, etc.

Figure 3:
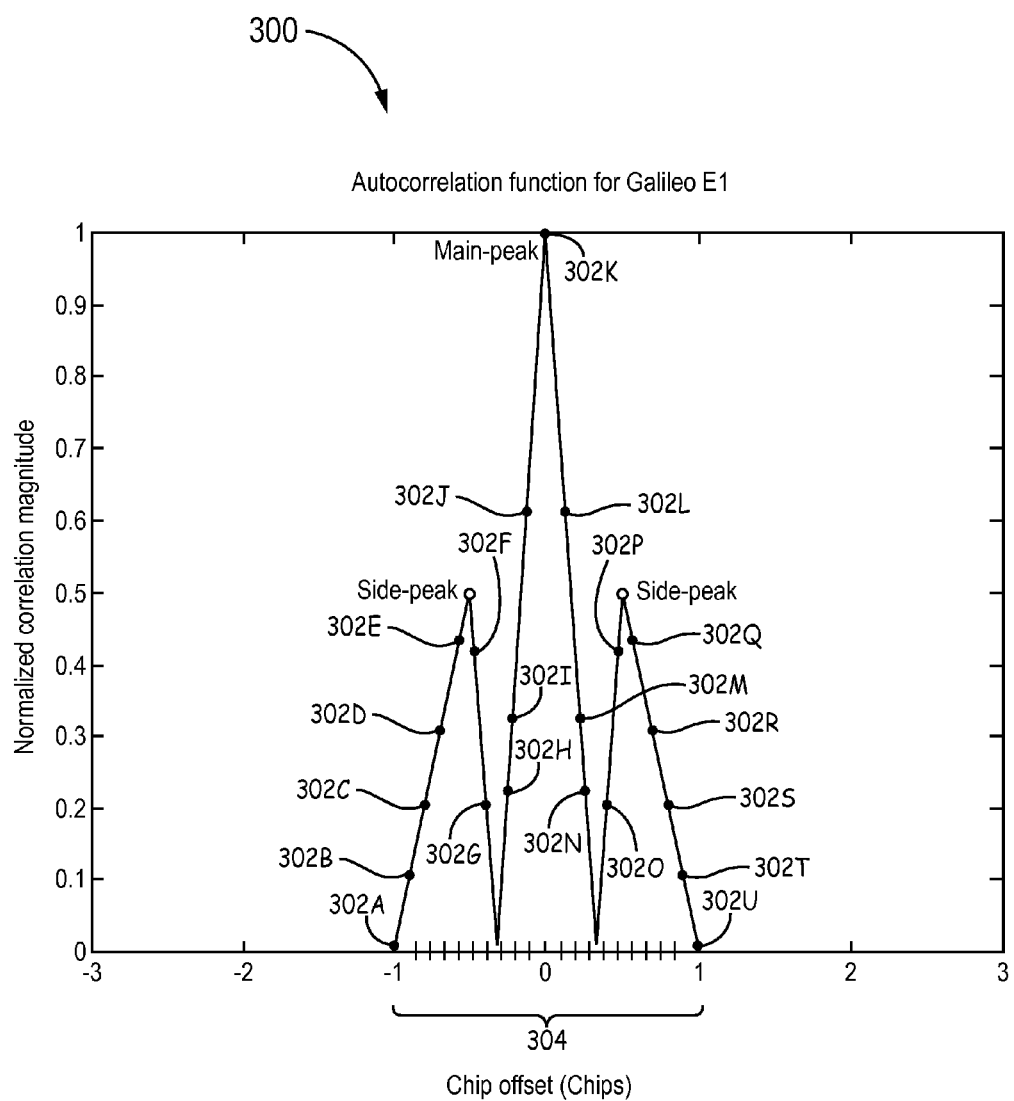

FIG. 3 is an example of an autocorrelation function 300 for a Galileo E1 frequency Binary Offset Carrier (Galileo E1 BOC) signal that is sampled by the scanning correlator 122 at respective time offsets 304. The sampling of the autocorrelation function 300 at respective time offsets 304 results in scanning values 302A-302U, which can be used to reconstruct the autocorrelation function 300. In some exemplary embodiments, the results from the scanning values 302A-302U can be normalized with respect to a prompt value produced by a prompt correlator 120. Furthermore, in some exemplary embodiments, the scanning values 302A-302U can be normalized with respect to the scanning value that has the greatest magnitude.

Similar to above, in some embodiments, the respective time offsets 304 can be in relation to one another. In other embodiments, the time offsets 304 can be with respect to a prompt value produced by a prompt correlator 120. Moreover, the number of time offsets 304 and the order of magnitude of the time offsets 304 can vary depending on the width of the autocorrelation function 300 and the desired resolution. In this example, the order of magnitude of the time offsets 304 are +/−0.1 chips and the time offsets 304 span a span duration of 2 chips, i.e., (−1 chip and +1 chip).

For BOC modulated signals, the embodiments described herein can be used to detect if the tracking loop is tracking any of the side-peaks instead of the main-peak. In some embodiments, this can be accomplished by checking the maximum value (i.e., scanning value 302K) and, in embodiments that include a prompt correlator 120, determining whether the maximum value 302K matches the delay being set for the prompt correlator 120 (which should be time aligned to the main peak). If side-peak tracking is detected, the tracking logic can move the prompt correlator 120 to the correct position by adjusting the code delay of the prompt correlator 120. By utilizing the scanning correlator 122 for BOC modulation side-peak detection, two conventional correlators (typically referred to as very early and very late) are not needed in the embodiments of tracking architecture described herein, thus reducing the complexity of the tracking channel. Moreover, for typical carrier-to-noise levels exhibited in the airborne receivers, the risk of degraded performance in terms of false-peak detection rate by using the scanning correlator 122 to detect BOC modulation side-peak tracking is not increased. For example, at low carrier-to-noise values, the correlation values are much noisier, meaning that longer averaging time for non-coherent integration or longer coherent integration time for each scanning point is needed. This leads to slower scanning time of the whole autocorrelation function, thus reducing the false-peak detection rate. In contrast, in still other embodiments, tracking may be performed by the scanning correlator 120 using the two-side-peaks instead of the main-peak.

Figure 4:
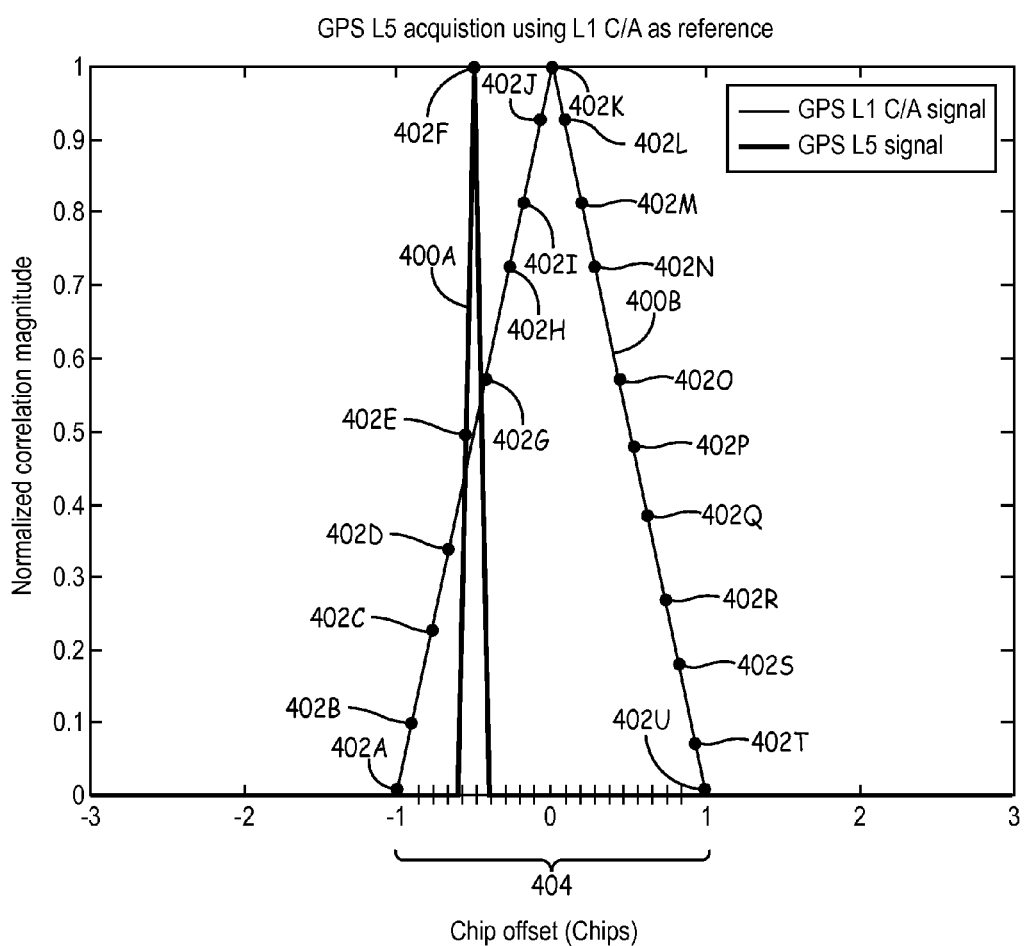

FIG. 4 is an example of autocorrelation functions 400A and 400B for GPS L5 frequency (L5) and L1 frequency (L1) signals, respectively, that are sampled by respective scanning correlators 122 at respective time offsets 404. The sampling of the autocorrelation functions 400A, 400B at respective time offsets 404 results in scanning values 402A-402U, which can be used to reconstruct the autocorrelation functions 400A, 400B. In some exemplary embodiments, the results from the scanning values 402A-402U can be normalized with respect to a prompt value produced by a respective prompt correlator 120-1. Furthermore, in some exemplary embodiments, the scanning values 402A-402U can be normalized with respect to the respective scanning value that has the greatest magnitude for the respective tracking channel.

Similar to above, in some embodiments, the respective time offsets 404 for each of the L5 and L1 signals, respectively, can be in relation to the other time offsets 404 for the given signal. In other embodiments, the time offsets 404 can be with respect to a prompt value produced by a respective prompt correlator 120-1. Moreover, the number of time offsets 404 and the order of magnitude of the time offsets 404 can vary depending on the width of the autocorrelation functions 400A, 400B and the desired resolution. In this example, the order of magnitude of the time offsets 404 for the L1 signal are +/−0.1 L1 chips and the time offsets 404 span a span duration of 2 L1 chips, i.e., (−1 chip and +1 chip). The chip rate for the L1 signal is different than the chip rate for the L5 signal. Hence, the respective time offsets can be different for each respective signal. For example, the same number of chips could be used for the L1 signal as for the L5 signal, but the span duration for the L1 time offsets could be different than the span duration for the L5 time offsets.

In addition, in some embodiments, the GPS L5, Galileo E5a, and/or BeiDou B2 signals can be acquired using the information from a respective tracking channel that is tracking the GPS L1, Galileo E1, and/or BeiDou B1 B1 signals, respectively, of the same satellite. Because the L1/E1, L5/E5, and B1/B2 signals are being transmitted by the same satellite, the signals are experiencing similar dynamic conditions. As a result, the code delay uncertainties can be reduced. However, small uncertainties in these values may still exist due to atmospheric effects and different signal processing paths for L1/E1/B1 and L5/E5/B2 signals in the GNSS receiver front-end. These uncertainties can be reduced using respective scanning correlators such as the exemplary scanning correlator 122 described above since the scanning correlator 122 can be configured to span the entire width of the respective autocorrelation functions. While FIG. 4 shows acquiring the GPS L5 signal based on information obtained by tracking the GPS L1 signal, the technique can be extended to cover all signals coming from a single satellite. For example, the system 100 can use L1 information to acquire the L2 signal, or E1 to acquire the E6 signal, etc.

Figure 5:
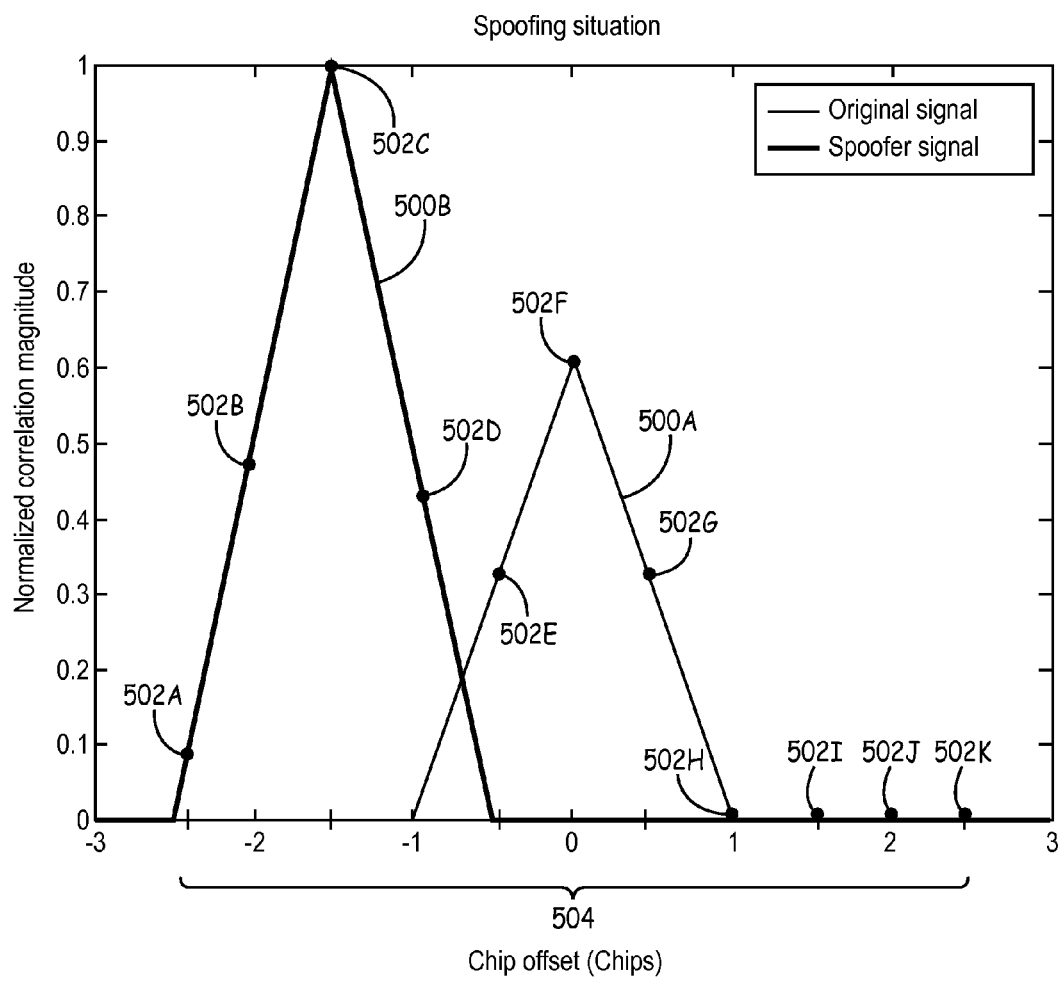

FIG. 5 is an example of autocorrelation functions 500A, 500B for a real GNSS signal and a signal that is meant to spoof the original signal (also referred to as a spoofing signal), respectively, that are sampled by the scanning correlator 122 at respective time offsets 504. The sampling of the autocorrelation functions 500A, 500B at respective time offsets 504 results in scanning values 502A-502K, which can be used to reconstruct the autocorrelation functions 500A, 500B. In some exemplary embodiments, the results from the scanning values 502A-502K can be normalized with respect to a prompt value produced by a prompt correlator 120. Furthermore, in some exemplary embodiments, the scanning values 502A-502K can be normalized with respect to the scanning value that has the greatest magnitude.

Similar to above, in some embodiments, the respective time offsets 504 can be in relation to one another. In other embodiments, the time offsets 504 can be with respect to a prompt value produced by a prompt correlator 120. Moreover, the number of time offsets 504 and the order of magnitude of the time offsets 504 can be selected based on the width of the autocorrelation functions 500A, 500B and the desired resolution. In this example, the order of magnitude of the time offsets 504 are +/−0.5 chips and the time offsets 504 span a span duration of 6 chips, i.e., (−3 chips and +3 chips).

In some embodiments, spoofers use a "lift and carry method" where the autocorrelation function 500B for the spoofing signal is initially aligned to the autocorrelation function 500A for the real GNSS signal and then gradually shifted away from the autocorrelation function 500A for the real GNSS signal to mislead the GNSS receiver. In these embodiments, the GNSS receiver may start to track the autocorrelation function 500B of the more powerful spoofing signal 500B. FIG. 5 is an example where the autocorrelation function 500B for the spoofing signal has already moved away from the autocorrelation function 500A for the real GNSS signal in the time domain. These types of attacks can be detected by the embodiments disclosed herein as two separate autocorrelation functions 500A, 500B will be reconstructed using the spanning correlator 122.

Figure 6:
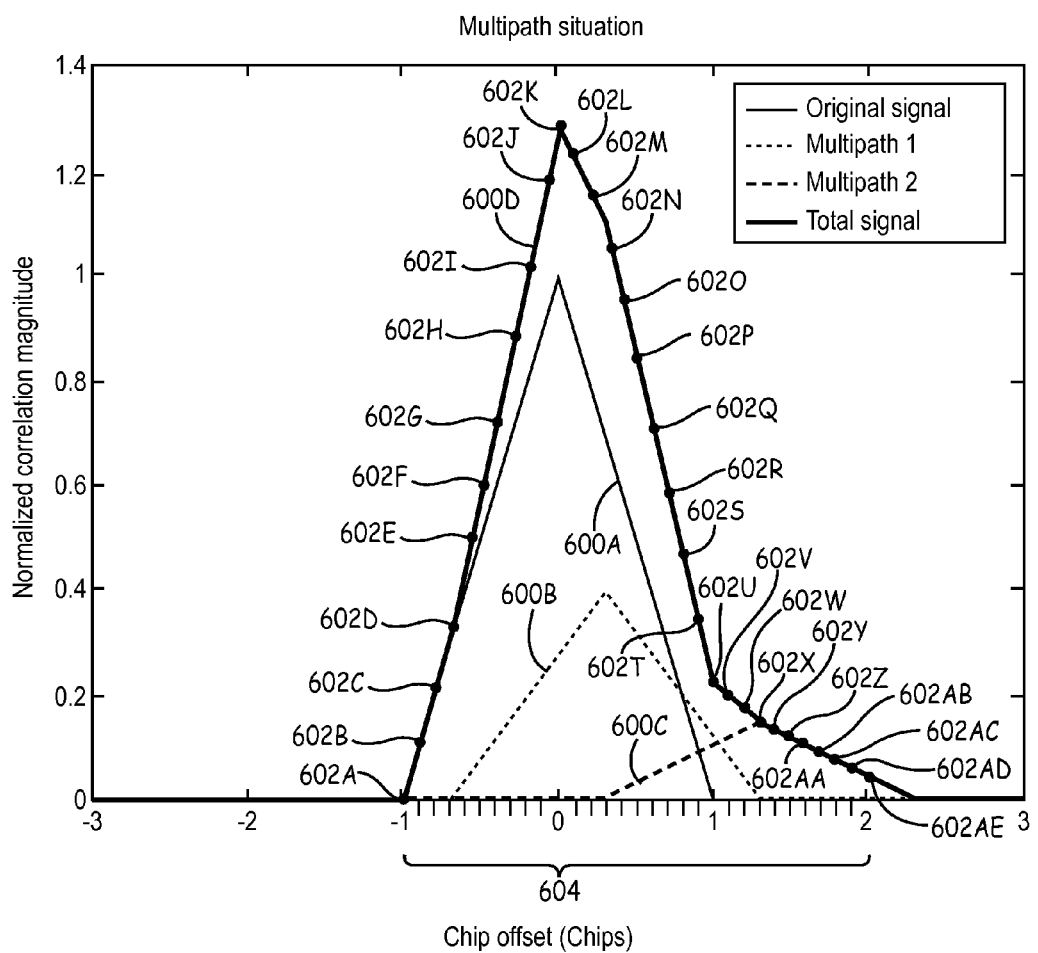

FIG. 6 is an example of autocorrelation functions 600A, 600B, 600C, 600D for a line-of-sight (LOS) GNSS signal, a first multipath signal, a second multipath signal, and a total combined signal, respectively. The total combined signal comprises the summation of the LOS GNSS signal, the first multipath and the second multipath signals. The total combined signal is sampled by the scanning correlator 122 at respective time offsets 604. The sampling of the total combined signal at respective time offsets 604 results in scanning values 602A-602AE, which can be used to reconstruct the autocorrelation function 600D for the total combined signal. In some exemplary embodiments, the results from the scanning values 602A-602AE can be normalized with respect to a prompt value produced by a prompt correlator 120. Furthermore, in some exemplary embodiments, the scanning values 602A-602AE can be normalized with respect to the scanning value that has the greatest magnitude.

Similar to above, in some embodiments, the respective time offsets 604 can be in relation to one another. In other embodiments, the time offsets 604 can be with respect to a prompt value produced by a prompt correlator 120. Moreover, the number of time offsets 604 and the order of magnitude of the time offsets 604 can vary depending on the width of the autocorrelation function 600D and the desired resolution. In this example, the order of magnitude of the time offsets 604 are +/−0.1 chips and the time offsets 604 span a span duration of 3 chips (i.e. −1 chip and +2 chips).

As is known, multipath is a phenomenon where the satellite signal received from one satellite is received through multiple different paths. Multipath is caused by a reflecting surface(s) near the GNSS receiver antenna 102. The autocorrelation functions 600B, 600C for the reflected signals are a time delayed and phase shifted version with respect to the autocorrelation function 600A for the LOS GNSS signal. The autocorrelation function 600D of the received signal is then a composite autocorrelation function 600D of all the autocorrelation functions 600B, 600C for the reflected signals together with the autocorrelation function 600A for the LOS GNSS signal. The distortion in the autocorrelation function 600D will cause biases in tracking of the satellite signal, as shown by the non-uniformity of the autocorrelation function 600D. These effects can be monitored by reconstructing the full autocorrelation function 600D using the embodiments disclosed herein.

Figure 7:
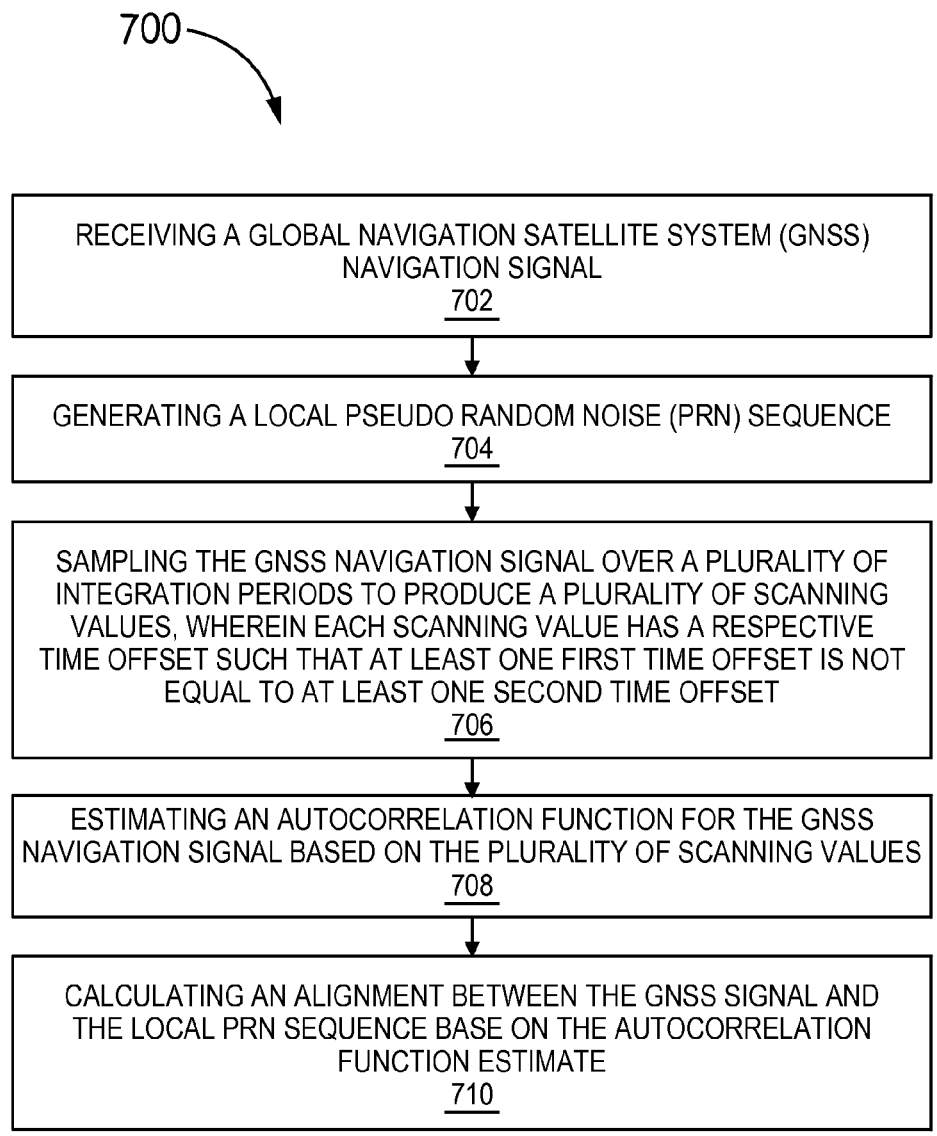
FIG. 7 is a flow chart of one embodiment of an exemplary method for GNSS receiver tracking.

FIG. 7 is an example method 700 for GNSS receiver tracking. In alternate implementations, method 700 may be used in conjunction with the autocorrelation functions 200-600D described with respect to FIGS. 2-6. Any alternatives or options described with respect to FIGS. 1-6 are therefore applicable to the method of FIG. 7 and vice-versa.

Method 700 comprises receiving a GNSS navigation signal (block 702). Examples of GNSS navigation signals include, but are not limited to: GPS L1 signals, GPS L5 signals, Galileo E1 BOC signals, Galileo E5 signals, BeiDou B1 signals BeiDou B5 signals, spoofing signals, and signals affected by multipath. In some embodiments, receiving the a GNSS navigation signal may further comprise mixing the GNSS signals down to an IF signal or down to a baseband frequency signal. As mentioned above, this may be achieved by using at least one mixer coupled to an NCO, such as the carrier NCO 112 discussed above in FIG. 1. The method proceeds to with generating a local Pseudo Random Noise (PRN) sequence (block 704). The local PRN sequence can be generated by a PRN generator. In some exemplary embodiments, the PRN generator can have some or all of the same characteristics as the PRN generator 110 discussed above. That is, to generate a PRN sequence at the particular code frequency, the PRN generator may receive an oscillating signal that is provided by a code NCO.

At 706, the method proceeds with sampling the GNSS navigation signal over a plurality of integration periods to produce a plurality of scanning values, wherein each scanning value has a respective time offset such that at least one first time offset is not equal to at least one second time offset. In some implementations, the times offsets may be may be determined based on applying different time offsets to the PRN sequence. At each of the time offsets, scanning values may be generated from either the IF signals or the baseband signals using scanning correlator such as described above. For example, each time offset can be an incremented multiple of a predetermined factor (e.g. +/−0.1 chips). The scanning values are used to align a local PRN sequence with the IF signal or the baseband signal. The time offsets can be with respect to a time offset for a prompt value or with respect to each different scanning values. For example, if a prompt value produced by a prompt correlator 120 has a time offset of 0 chips, then in some embodiments, the other scanning values have time offsets that are in increments +/−0.1*x chips with respect to the prompt value, where x is an integer greater than 1. However, the magnitude of +/−0.1 is only an example and not meant to be limiting. In other exemplary embodiments, the scanning value can have time offsets with respect to the time offset for a first scanning value. For example, instead of the prompt value having a time offset of 0 chips, a first scanning value will have a time offset of 0 chips. In these embodiments, the other scanning values can have time offsets that are in increments of +/−0.5*x chips with respect to the first scanning value. Similar to above, however, the magnitude of +/−0.5 is only an example and not meant to be limiting. However, in some embodiments, the difference in time offsets can be at least one of the following, +/−0.01 chips, +/−0.05 chips, +/−0.1 chips, +/−0.5 chips etc. and the time offsets can span different span durations, e.g., 1 chip, 2 chips, 3 chips, 4 chips, 5 chips, 6 chips, etc. However, these are only examples and not meant to be limiting.

The method then proceeds to 708 with estimating an autocorrelation function (or at least two points of the autocorrelation function) for the GNSS navigation signal based on the plurality of scanning values. As discussed above, samples are taken over a plurality of integration periods and produce a plurality of scanning values from which an autocorrelation function can be reconstructed. That is, the scanning values can be used to align a local PRN sequence with the IF signal or the baseband signal. Further, all the autocorrelation function defects can be detected prior to aligning the incoming signal with the replica. As such, the method proceeds with calculating an alignment between the received GNSS signal and the Pseudo Random Noise sequence based on the autocorrelation function estimate (block 710).

In some embodiments, the method 700 may optionally include adjusting a chip rate of the local PRN sequence based on the scanning values. For example, the chip rate can be adjusted by a received oscillating signal that is provided by a code NCO. However, in other embodiments, the chip rate of the local PRN sequence may be controlled by other means, such as but not limited to using early and late correlators, or even open-loop controls.

In some embodiments of method 700, once code and carrier offsets are determined, that information is used to adjust the code (or chip) and carrier rates. The result of the correlation may be processed to determine a code and carrier frequency and/or phase offset. In exemplary embodiments, this can be done using a control block similar to the control block 140 discussed above. That is, a processor, such as the processor 116 in control block 140 discussed above in FIG. 1, can receive the correlated signal and determine the code and carrier frequency and/or phase offset.

One or more actions described in the present methods can be implemented by computer executable instructions, such as program modules or components, which are executed by at least one processor. Generally, program modules include routines, programs, objects, data components, data structures, algorithms, and the like, which perform particular tasks or implemented particular abstract data types.

Instructions for carrying out the various process tasks, calculations, and generation of other data used in operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programming logic device.

Example Embodiments

Example 1 includes a Global Navigation Satellite System (GNSS) receiver, the receiver comprising: a front end configured to receive GNSS signals; a code and carrier remover coupled to the front end; a carrier numerically controlled oscillator coupled to the code and carrier remover and generating a first oscillating signal; a code numerically controlled oscillator coupled to the code and carrier remover and generating a second oscillating signal; wherein the code and carrier remover comprises: a carrier remover configured to down convert a received GNSS signal based on the first oscillating signal; a correlator block comprising at least a scanning correlator; and a Pseudo Random Noise generator coupled to the correlator block, the Pseudo Random Noise generator producing a local Pseudo Random Noise sequence based at least in part on the second oscillating signal; wherein the scanning correlator is configured to estimate at least two points of an autocorrelation function estimate of the received GNSS signal based on a plurality of scanning values derived from sampling the received GNSS signal, wherein each scanning value has a respective time offset such that at least one first time offset is not equal to at least one second time offset; wherein the scanning correlator calculates an alignment between the received GNSS signal and the Pseudo Random Noise sequence based on the autocorrelation function estimate; and a control block coupled to the code numerically controlled oscillator and the carrier numerically controlled oscillator.

Example 2 includes the receiver of example 1, wherein the control block controls the first oscillating signal and the second oscillating signal based on feedback from the correlator block.

Example 3 includes the receiver of any of examples 2, wherein the feedback from the correlator block is based on the plurality of scanning values.

Example 4 includes the receiver of any of examples 1-3, wherein the carrier remover comprises a mixer that downconverts the received GNSS signal from an Intermediate Frequency to a Baseband frequency based on the first oscillating signal.

Example 5 includes the receiver of any of examples 1-4, wherein a difference between the at least one first time offset and the at least one second time offset is at least one of the following: +/−0.5 chips, +/−0.1 chips or +/−0.01 chips.

Example 6 includes the receiver of any of examples 1-5, wherein the respective time offsets of the scanning values together span a span duration of at least one of the following: 1 chip, 2 chips, 3 chips, 4 chips, 5 chips or 6 chips.

Example 7 includes the receiver of any of examples 1-6, wherein the scanning values are normalized with respect to a scanning value that has the greatest magnitude.

Example 8 includes the receiver of any of examples 1-7, wherein the correlator block further includes a prompt correlator that generates a prompt value by processing the received GNSS signal; and wherein the respective time offset for each scanning value is defined as an offset from the prompt value.

Example 9 includes the receiver of example 8, wherein the scanning values are normalized with respect to the prompt values.

Example 10 includes the receiver of any of examples 1-9, wherein the respective time offsets for each of the scanning values are defined with respect to an offset from a first scanning value.

Example 11 includes a method for Global Navigation Satellite System (GNSS) receiver tracking, the method comprising: receiving a GNSS navigation signal; generating a local Pseudo Random Noise (PRN) sequence; sampling the GNSS navigation signal over a plurality of integration periods to produce a plurality of scanning values, wherein each scanning value has a respective time offset such that at least one first time offset is not equal to at least one second time offset; estimating at least two points of an autocorrelation function for the GNSS navigation signal based on the plurality of scanning values; and calculating an alignment between the GNSS signal and the local PRN sequence based on the autocorrelation function estimate.

Example 12 includes the method of example 11, further comprising: adjusting a chip rate of the local PRN sequence based on the alignment.

Example 13 includes the method of any of examples 11-12, further comprising: wherein the plurality of scanning values are calculated at least in part based on the local PRN sequence.

Example 14 includes the method of any of examples 11-13, further comprising: converting the received GNSS signal from an Intermediate Frequency to a Baseband frequency.

Example 15 includes the method of any of examples 11-14, wherein a difference between the at least one first time offset and the at least one second time offset is at least one of the following: +/−0.5 chips, +/−0.1 chips or +/−0.01 chips.

Example 16 includes the method of any of examples 11-15, wherein the respective time offsets of the scanning values together span a span duration at least one of the following: 1 chip, 2 chips, 3 chips, 4 chips, 5 chips or 6 chips.

Example 17 includes the method of any of examples 11-16, further comprising normalizing the scanning values with respect to a scanning value that has the greatest magnitude.

Example 18 includes the method of any of examples 11-17, further comprising: applying the received GNSS signal to a prompt correlator to generate a prompt value; wherein the respective time offset for each scanning value is defined as an offset from the prompt value.

Example 19 includes the method of example 18, wherein the scanning values are normalized with respect to the prompt value.

Example 20 includes the method of any of examples 11-19, wherein the respective time offsets for each of the scanning values are defined with respect to an offset from a first scanning value.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A Global Navigation Satellite System (GNSS) receiver, the receiver comprising:
   a front end configured to receive GNSS signals;
   a code and carrier remover coupled to the front end;
   a carrier numerically controlled oscillator coupled to the code and carrier remover and generating a first oscillating signal,
   a code numerically controlled oscillator coupled to the code and carrier remover and generating a second oscillating signal,
   wherein the code and carrier remover comprises:
      a carrier remover configured to down convert a received GNSS signal based on the first oscillating signal,
      a correlator block comprising at least a scanning correlator; and
      a Pseudo Random Noise generator coupled to the correlator block, the Pseudo Random Noise generator producing a local Pseudo Random Noise sequence based at least in part on the second oscillating signal,
   wherein the scanning correlator is configured to estimate at least two points of an autocorrelation function of the received GNSS signal based on a plurality of scanning values derived from sampling the received GNSS signal, wherein the at least two points of the autocorrelation function are based on scanning values of the plurality of scanning values that are captured during different integration periods, wherein each scanning value of the plurality of scanning values has a respective time offset variably controlled such that at least one first time offset of the plurality of scanning values is not equal to at least one second time offset of the plurality of scanning values;

wherein the scanning correlator calculates an alignment between the received GNSS signal and the Pseudo Random Noise sequence based on the autocorrelation function estimate; and a control block coupled to the code numerically controlled oscillator and the carrier numerically controlled oscillator;

wherein the correlator block further includes a reference correlator that generates a second value by processing the received GNSS signal; and wherein the respective time offset for each scanning value of the plurality of scanning values is varied by the control block either forward or backward by a fraction of a code chip with respect to a fixed reference point provided by a time offset of the reference correlator.

2. The receiver of claim 1, wherein the control block controls the first oscillating signal and the second oscillating signal based on feedback from the correlator block.

3. The receiver of claim 2, wherein the feedback from the correlator block is based on the plurality of scanning values.

4. The receiver of claim 1, wherein the carrier remover comprises a mixer that downconverts the received GNSS signal from an Intermediate Frequency to a Baseband frequency based on the first oscillating signal.

5. The receiver of claim 1, wherein a difference between the at least one first time offset and the at least one second time offset is at least one of the following: +/−0.5 chips, +/−0.1 chips or +/−0.01 chips.

6. The receiver of claim 1, wherein the respective time offsets of the plurality of scanning values together span a span duration of at least one of the following: 1 chip, 2 chips, 3 chips, 4 chips, 5 chips or 6 chips.

7. The receiver of claim 1, wherein the plurality of scanning values are normalized with respect to a scanning value that has the greatest magnitude.

8. The receiver of claim 1, wherein the reference correlator comprises a prompt correlator that generates a prompt value by processing the received GNSS signal.

9. The receiver of claim 8, wherein the plurality of scanning values are normalized with respect to the prompt values.

10. A method for Global Navigation Satellite System (GNSS) receiver tracking, the method comprising:
receiving a GNSS navigation signal;
generating a local Pseudo Random Noise (PRN) sequence;
sampling the GNSS navigation signal over a plurality of integration periods to produce a plurality of scanning values, wherein each scanning value of the plurality of scanning values has a respective time offset variably controlled by a control block such that at least one first time offset is not equal to at least one second time offset;
estimating at least two points of an autocorrelation function for the GNSS navigation signal based on scanning values of the plurality of scanning values captured during different integration periods;
calculating an alignment between the GNSS signal and the local PRN sequence based on the autocorrelation function estimate; and
applying the received GNSS signal to a reference correlator to generate a second value;
wherein the respective time offset for each scanning value of the plurality of scanning values is varied by the control block either forward or backward by a fraction of a code chip with respect to a fixed reference point provided by a time offset of the reference correlator.

11. The method of claim 10, further comprising:
adjusting a chip rate of the local PRN sequence based on the calculated alignment.

12. The method of claim 10, further comprising:
wherein the plurality of scanning values are calculated at least in part based on the local PRN sequence.

13. The method of claim 10, further comprising:
converting the received GNSS signal from an Intermediate Frequency to a Baseband frequency.

14. The method of claim 10, wherein a difference between the at least one first time offset and the at least one second time offset is at least one of the following: +/−0.5 chips, +/−0.1 chips or +/−0.01 chips.

15. The method of claim 10, wherein the respective time offsets of the scanning values together span a span duration at least one of the following: 1 chip, 2 chips, 3 chips, 4 chips, 5 chips or 6 chips.

16. The method of claim 10, further comprising normalizing the plurality of scanning values with respect to a scanning value that has the greatest magnitude.

17. The method of claim 10, wherein the reference correlator comprises a prompt correlator that generates a prompt value by processing the received GNSS signal.

18. The method of claim 17, wherein the plurality of scanning values are normalized with respect to the prompt value.

* * * * *